United States Patent
Nayebi et al.

[19]

[11] Patent Number: 5,812,208

[45] Date of Patent: Sep. 22, 1998

[54] BURST SEPARATOR AND SLICER CIRCUIT

[75] Inventors: Mehrdad Nayebi, Palo Alto; Duc Ngo, San Jose, both of Calif.

[73] Assignees: Sony Corporation, Tokyo, Japan; Sony Electronics, Inc., Park Ridge, N.J.

[21] Appl. No.: 585,429

[22] Filed: Jan. 11, 1996

Related U.S. Application Data

[60] Provisional application No. 60/000,371 Jun. 21, 1995.

[51] Int. Cl. [6] .............................. H04N 9/45; H04N 9/455
[52] U.S. Cl. ............................................ 348/506; 348/505
[58] Field of Search .................................. 348/506, 505, 348/507, 508; H04N 9/45, 9/455

[56] References Cited

U.S. PATENT DOCUMENTS

| | | | |
|---|---|---|---|
| 3,789,141 | 1/1974 | Ayaki et al. | 348/506 |
| 3,918,085 | 11/1975 | Numakura et al. | 358/4 |
| 4,007,482 | 2/1977 | Amari | 358/4 |
| 4,054,903 | 10/1977 | Ninomiya | 358/8 |
| 4,120,000 | 10/1978 | Ninomiya | 358/8 |
| 4,550,338 | 10/1985 | Kojima | 348/506 |
| 4,706,034 | 11/1987 | Kojima | 348/506 |

*Primary Examiner*—Michael Lee
*Attorney, Agent, or Firm*—Haverstock & Owens LLP

[57] ABSTRACT

A burst separator and slicer circuit separates the burst signal from an input composite video signal. Each period of the input composite video signal includes a horizontal synchronization signal, a burst signal and a video information signal. A burst gate pulse signal representing the presence of the burst signal within the input composite video signal is received by the burst separator and slicer circuit. During the burst period, when the burst gate pulse is active, the burst signal is extracted from the input composite video signal and converted to a square waveform. A differential pair and comparator circuit monitors the input composite video signal and compares it to a constant level reference voltage signal. A constant high voltage level is output when the burst signal is greater than the constant level reference signal. A constant low voltage level is output when the burst signal is less than the constant level reference signal. During non-burst periods a constant DC level voltage signal is output by the burst separator and slicer circuit.

14 Claims, 3 Drawing Sheets

BURST SEPARATOR AND SLICER CIRCUIT

RELATED APPLICATIONS

This application claims priority under 35 U.S.C. § 119(e) of the co-pending U.S. provisional application Ser. No. 60/000,371 filed on Jun. 21, 1995 and entitled "Burst Separator And Slicer Circuit." The provisional application Ser. No. 60/000,371 filed on Jun. 21, 1995 and entitled "Burst Separator And Slicer Circuit" is also hereby incorporated by reference.

FIELD OF THE INVENTION

The present invention relates to the field of separating a burst signal from a composite video signal. In particular, the present invention relates to the field of separating a burst signal from a composite video signal and converting the burst signal to another format.

BACKGROUND OF THE INVENTION

A composite color video signal includes horizontal synchronizing signals, a burst signal superimposed onto the pedestal level at the back porch of the horizontal synchronizing signal and a video information signal. The video information signal comprises a chrominance subcarrier having different phases amplitude-modulated with chrominance information. The composite color video signal includes both luminance and chrominance information.

Separator circuits are utilized to separate the horizontal synchronizing signal and the burst signal from the incoming composite video signal. The burst signal consists of a sinusoid with a frequency equal to 3.58 MHz, which is the frequency of the chrominance subcarrier $f_{SC}$. When separating the burst signal from the composite video signal it is necessary for the separator circuitry to determine when the burst signal is present on the incoming composite video signal.

In many video transmission systems, color or chrominance information is represented by a particular phase of the chrominance subcarrier signal that is amplitude modulated with color information. Since the phase of the color subcarrier signal is used to represent color information, it is important that, when digitally encoding the color video signal, the phase of the sampling pulses is accurately controlled. Undesired phase shifts, due to temperature drift, aging of the electrical components, and the like, may result in a phase error in the sampling pulse relative to the chrominance subcarrier signal which has the effect of distorting or interfering with the overall chrominance effect of the video picture which ultimately is reproduced from the digitally encoded video signal.

To identify the aforementioned phase shifts between the sampling pulses and the chrominance subcarrier signal, the instantaneous phase angle of the burst signal at the time of sampling is determined. If the phase angle of the burst signal differs from a desired phase angle, the phase of the sampling pulses may be adjusted accordingly. If the phase angle of the burst signal is different than an expected phase angle, the phase difference between the modulated chrominance information and the signal will also be in error, thereby causing distortion of the color within an output video signal.

It is therefore important to the operation of the video transmission system that the burst signal is separated correctly from the composite video signal in order that the phase of the burst signal can be compared to the phase of a reference signal. Any error in separating the burst signal from the input composite video signal may result in an error determining the phase difference between the two signals and will cause the output video signal to be in error.

SUMMARY OF THE INVENTION

A burst separator and slicer circuit separates the burst signal from an input composite video signal. Each period of the input composite video signal includes a horizontal synchronization signal, a burst signal and a video information signal. A burst gate pulse signal representing the presence of the burst signal within the input composite video signal is received by the burst separator and slicer circuit. During the burst period, when the burst gate pulse is active, the burst signal is extracted from the input composite video signal and converted to a square waveform. A differential pair and comparator circuit monitors the input composite video signal and compares it to a constant level reference voltage signal. A constant high voltage level is output, during the burst period, when the burst signal is greater than the constant level reference signal. A constant low voltage level is output, during a burst period, when the burst signal is less than the constant level reference signal. During non-burst periods a constant DC level voltage signal is output by the burst separator and slicer circuit.

DETAILED DESCRIPTION OF THE PREFERRED EMBODIMENT

A burst separator and slicer circuit according to the present invention separates the burst signal from an input composite video signal and converts the burst signal to a square waveform. Within a composite video signal, a burst signal traditionally follows a horizontal synchronization signal and precedes the video information signal. The burst signal within the composite video signal is a sinusoidal signal having a midpoint at a reference voltage level which is referred to as a pedestal level. A burst gate pulse representing the presence of the burst signal within the input composite video signal is received by the burst gate separator and slicer circuit. During the period when the burst gate pulse is active the burst signal is extracted from the input composite video signal by the burst separator and slicer circuit of the present invention. When separating the burst signal from the input composite video signal, the burst signal is also converted from a sinusoidal signal to a square waveform by the burst separator and slicer circuit of the present invention. A constant DC level signal is output by the burst separator and slicer circuit during the non-burst periods when the burst signal is not present within the composite video signal.

Figure 1:
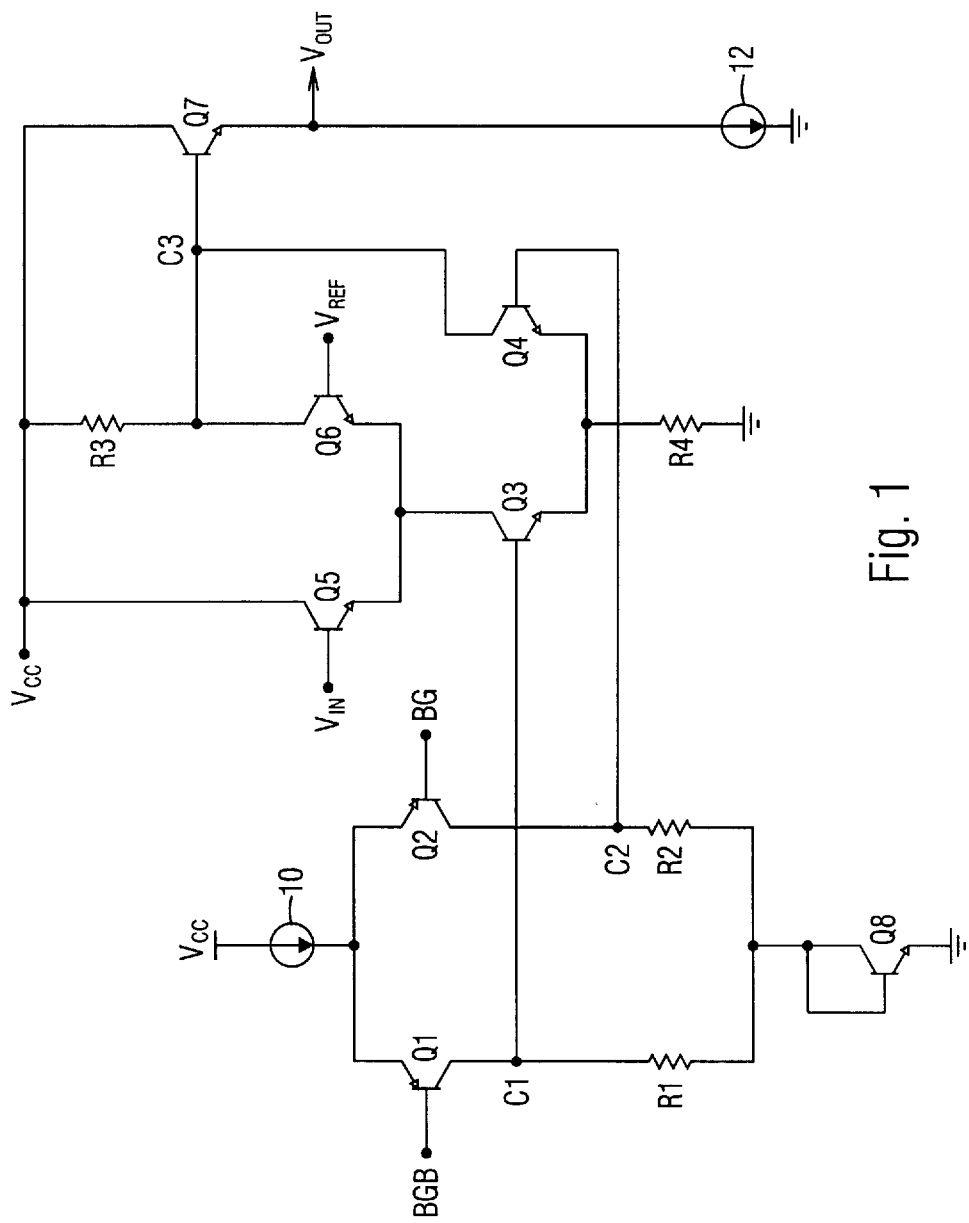
FIG. 1 illustrates a circuit diagram of the burst separator and slicer circuit of the present invention.

The burst separator and slicer circuit according to the present invention is illustrated in FIG. 1. A burst gate pulse signal BG is coupled to the base of a pnp transistor Q2. An inverse burst gate pulse signal BGB is coupled to the base of a pnp transistor Q1. The emitter of the transistor Q1 is coupled to the emitter of the transistor Q2 and to the first terminal of a current source 10. The second terminal of the current source 10 is coupled to a supply voltage VCC. Together, the transistors Q1 and Q2 form a differential pair. The collector of the transistor Q1 is coupled to the base of an npn transistor Q3 and to the first terminal of a resistor R1, thereby forming a control voltage node C1. The collector of the transistor Q2 is coupled to the base of an npn transistor Q4 and to the first terminal of a resistor R2, thereby forming a control voltage node C2. The second terminal of the resistor R1 is coupled to the second terminal of the resistor R2 and to the base and collector of an npn transistor Q8. The emitter of the transistor Q8 is coupled to ground.

An input composite video signal Vin is coupled to the base of an npn transistor Q5. A constant voltage reference signal Vref is coupled to the base of an npn transistor Q6. The collector of the transistor Q5 is coupled to the collector of an npn transistor Q7, to the first terminal of a resistor R3 and to the supply voltage VCC. The second terminal of the resistor R3 is coupled to the base of the transistor Q7, to the collector of the transistor Q6 and to the collector of a transistor Q4, thereby forming a voltage node C3. The emitter of the transistor Q5 is coupled to the emitter of the transistor Q6 and to the collector of the transistor Q3. Together, the transistors Q5 and Q6 form a differential pair which is controlled by the transistor Q3 and the control voltage node C1. The emitter of the transistor Q3 is coupled to the emitter of the transistor Q4 and to the first terminal of a resistor R4. The second terminal of the resistor R4 is coupled to ground. The emitter of the transistor Q7 is coupled to the first terminal of a current source 12 and provides the output node Vout for the burst separator and slicer circuit of the present invention. The second terminal of the current source 12 is coupled to ground.

The burst separator and slicer circuit according to the present invention receives the burst gate signal BG and the inverse burst gate signal BGB from a burst gate pulse generator circuit. The burst gate pulse generator circuit monitors the input composite video signal and generates a pulse representing the presence of the burst signal within the input composite video signal. Therefore, when the burst gate signal BG is active the burst signal is present within the input composite video signal. In the preferred embodiment of the present invention, the burst gate signal BG and the inverse burst gate signal BGB are provided by a gate pulse generator circuit as taught in U.S. patent application Ser. No. 08/583,986 Burst Gate Pulse Generator and filed on Jan. 11, 1996.

The transistors Q1 and Q2 form a differential pair which causes a proportional current mismatch if there is a difference in the base voltage of the two transistors Q1 and Q2. The transistor Q1 or Q2 with the greater base voltage will have a proportional increased amount of current through its collector. Because the burst gate and inverse burst gate signals BG and BGB are designed to always be in opposite logical states, one of the collectors of the transistors Q1 and Q2 will always have an increased amount of current flowing through it. Which one of the transistors Q1 and Q2 will have the increased amount of current flowing through its collector will depend on the states of the signals BG and BGB. During a burst period, the burst gate signal BG will be at a logical high voltage level and the inverse burst gate signal BGB will be at a logical low voltage level. During the burst period therefore, more current will flow through the collector of the transistor Q2 than through the collector of the transistor Q1. Because more current flows through the collector of the transistor Q2, more voltage is dropped across the resistor R2, thereby pulling the voltage level at the voltage control node C2 down and turning the transistor Q4 off. Correspondingly, less current will flow through the collector of the transistor Q1 causing less voltage to be dropped across the resistor R1 and raising the voltage level at the voltage control node C1. This will turn on the transistor Q3.

During a non-burst period, the burst gate signal BG will be at a logical low voltage level and the inverse burst gate signal BGB will be at a logical high voltage level. Therefore, during the non-burst period, more current will flow through the collector of the transistor Q1 than through the collector of the transistor Q2. Because more current flows through the collector of the transistor Q1, more voltage is dropped across the resistor R1, thereby pulling the voltage level at the voltage control node C1 down and turning off the transistor Q3. Correspondingly, less current flows through the collector of the transistor Q2 causing less voltage to be dropped across the resistor R2 and raising the voltage level at the voltage control node C2. This will turn on the transistor Q4.

During a burst period, when the burst gate signal BG is at an active high voltage level and the inverse burst gate signal BGB is at an active low voltage level, the voltage at the control voltage node C1 goes high and activates the transistor Q3. When the transistor Q3 is turned on the differential pair of transistors Q5 and Q6 is enabled because the transistor Q3 provides a path for the tail current from the transistors Q5 and Q6 to flow. During this period the input composite video signal Vin is transferred to the output node Vout. The differential pair made up of the transistors Q5 and Q6 also acts as a comparator and converts the input composite video signal Vin to a square wave by comparing the input composite video signal Vin to a constant reference voltage level Vref. This constant reference voltage level Vref maintains a constant voltage level at the pedestal level of the input composite video signal, as illustrated in FIG. 2a. As the input composite video signal Vin oscillates above and below the constant reference voltage level Vref, during the burst period, the burst separator and slicer circuit of the present invention converts the input composite video signal Vin to a square waveform.

When the voltage level of the input composite video signal Vin is greater than the level of the constant reference voltage signal Vref, during a burst period, there is less current flowing through the collector of the transistor Q6. When there is less current flowing through the collector of the transistor Q6 there is less voltage dropped across the resistor R3 and therefore the voltage at the control voltage node C3 rises to a higher level turning the transistor Q7 on. When the transistor Q7 is on, the voltage level at the output node Vout rises to a level close to the level of the supplying voltage VCC and will remain constant until the transistor Q7 is turned off. This output level will be the maximum level of the output square waveform.

When the voltage level of the input composite video signal Vin is less than the level of the constant reference voltage signal Vref, during a burst period, there is a greater amount of current flowing through the collector of the transistor Q6. When there is more current flowing through the collector of the transistor Q6 there is more voltage dropped across the resistor R3 and therefore the voltage at the control voltage node C3 will decrease to a lower level and will turn the transistor Q7 off. When the transistor Q7 is off, the voltage level at the output node Vout will fall to a level close to the ground level and will remain constant until the transistor Q7 is turned on again. This output level will be the minimum level of the output square waveform.

When the burst signal is present within the input composite video signal Vin, the input composite video signal will oscillate above and below the pedestal level or the level of the constant reference voltage Vref. As the burst signal oscillates above and below the constant reference voltage Vref, the slicer circuit made up of the transistors Q5, Q6 and Q7 converts the burst signal to a square waveform, as described above. Converting the burst signal to a square waveform when it is separated from the input composite video signal Vin allows the phase lock loop circuit of the video system to more easily detect and control phase shifts between the input composite video signal Vin and a reference composite video signal.

Figure 2:
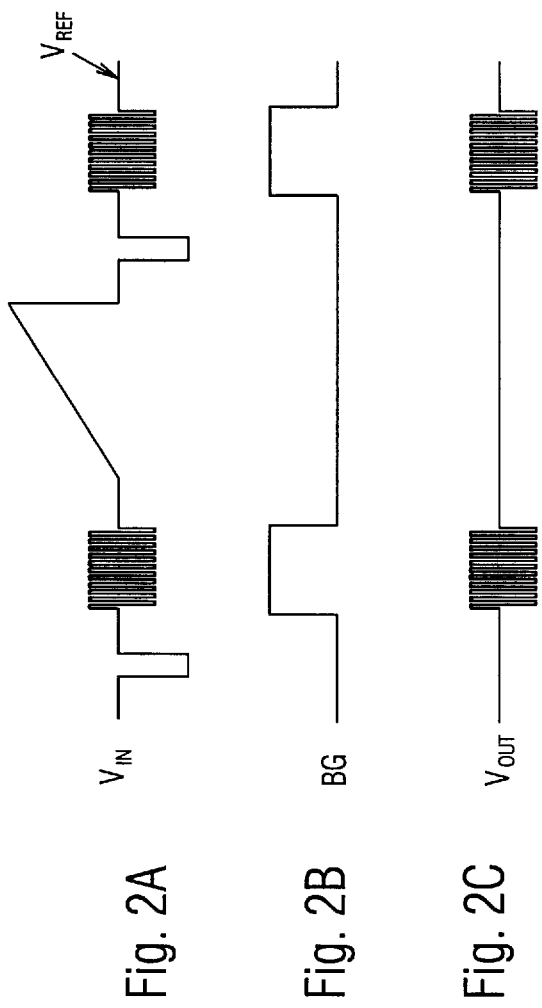
FIG. 2a illustrates a waveform of an input composite video signal Vin.
FIG. 2b illustrates a waveform representing the input signal at the voltage node BG which when active represents the presence of a burst signal within the input composite video signal Vin.
FIG. 2c illustrates a waveform representing the output signal Vout.

Timing diagrams taken at relevant points within the burst separator and slicer circuit of FIG. 1 are illustrated in FIG. 2. An input composite video signal Vin is illustrated in FIG. 2a. A waveform representing the burst gate signal BG is illustrated in FIG. 2b. A waveform representing the signal at the output voltage node Vout is illustrated in FIG. 2c. The burst gate signal BG is active, as illustrated in FIG. 2b, during periods when the burst signal is present within the input composite video signal Vin, illustrated in FIG. 2a. During burst periods, when the burst gate signal BG is active, the burst separator and slicer circuit of the present invention, separates the burst signal from the input composite video signal Vin and converts it into a square waveform, as illustrated in FIG. 2c. This separated and converted signal is output at the output voltage node Vout. During non-burst periods, when the burst gate signal BG is not active, the signal at the output voltage node Vout is maintained at a constant level.

During a non-burst period, when the burst signal is not present within the input composite video signal Vin, the burst gate signal BG is at a logical low voltage level and the inverse burst gate signal BGB is at a logical high voltage level, thereby lowering the voltage level at the control voltage node C1 and turning off the transistor Q3. Because less current is flowing through the collector of the transistor Q2, less voltage is dropped across the resistor R2, raising the voltage level at the control voltage node C2 and turning on the transistor Q4. When the transistor Q3 is turned off, the differential pair made up of the transistors Q5 and Q6 is disabled because there is no path for the tail current of the differential pair to flow. During non-burst periods, current will therefore flow through the resistor R3 and through the collector of the transistor Q4. The transistor Q7 will be turned on and a constant DC voltage level will be maintained at the output voltage node Vout.

In this manner, the burst separator and slicer circuit separates the burst signal from the input composite video signal Vin and converts the burst signal from a sinusoid signal to a square waveform. During the burst period, the burst signal is monitored and compared to a constant level reference voltage signal Vref. A constant high voltage level is output when the burst signal is greater than the constant level reference signal Vref. A constant low voltage level is output when the burst signal is less than the constant level reference signal Vref. During the non-burst period a constant DC level voltage signal is output by the burst separator and slicer circuit of the present invention.

Figure 3:
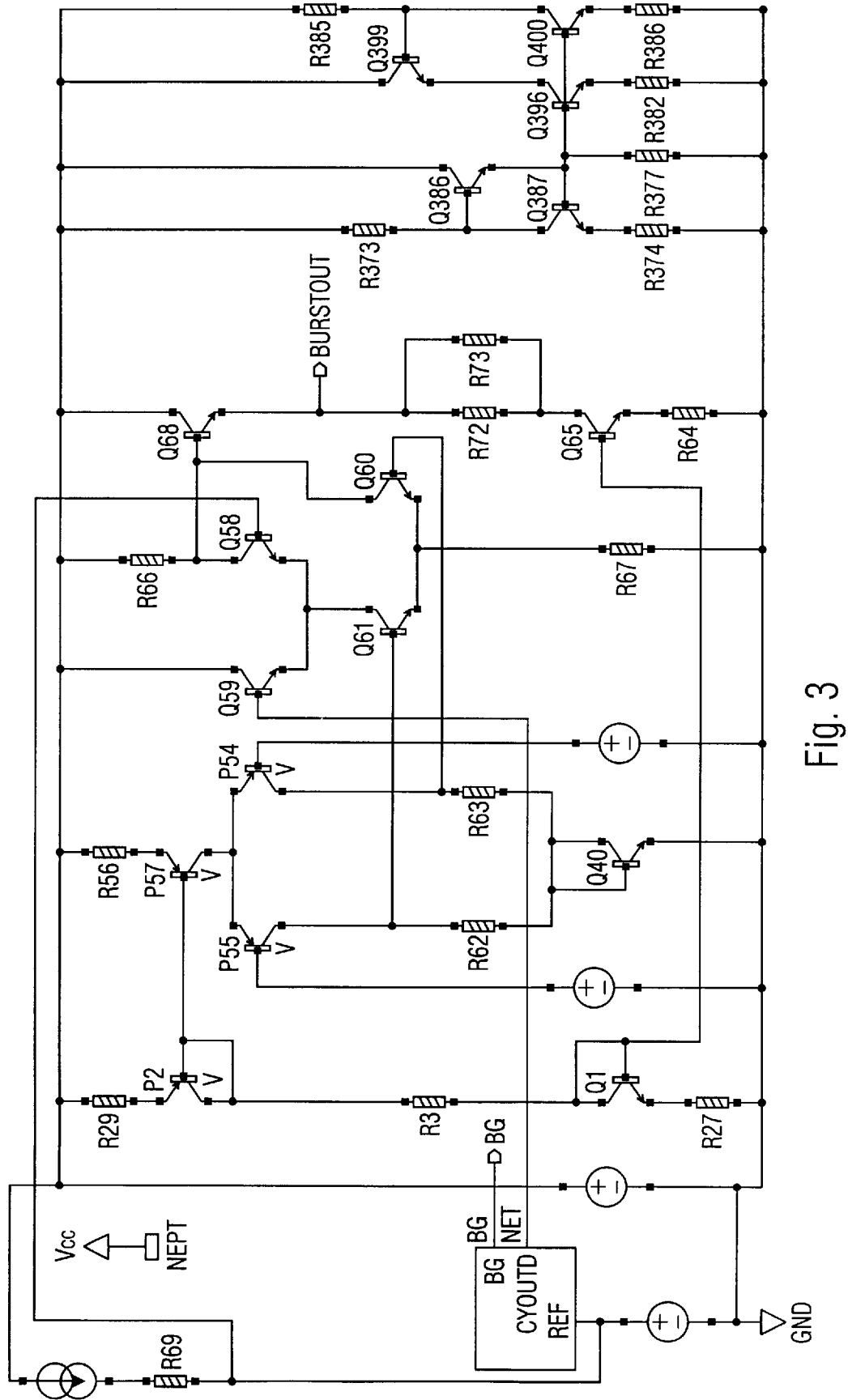
FIG. 3 illustrates a detailed circuit schematic of the preferred embodiment of the burst separator and slicer circuit of the present invention.

A detailed circuit schematic of the preferred embodiment of the burst separator and slicer circuit is illustrated in FIG. 3. The preferred embodiment of the present invention is implemented within a video/graphics overlay integrated circuit, Part No. CXA2015Q, which will be available from Sony Corporation of America, 3300 Zanker Road, San Jose, Calif. 95134.

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL. It will also be apparent to those skilled in the art that different logic circuit configurations could be substituted for the logic circuit described above to perform the functions of the preferred embodiment.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A burst separator circuit for separating a burst signal from an input composite video signal, comprising:
   a. a receiving circuit configured for receiving a burst gate pulse representative of a time period during which the burst signal is present within the input composite video signal;
   b. a burst separating circuit configured for receiving the input composite video signal and coupled to the receiving circuit for separating the burst signal from the input composite video signal when the burst gate pulse is active; and
   c. a slicer circuit coupled to the burst separating circuit for converting the burst signal to a square waveform signal when it is separated from the input composite video signal.

2. The burst separator circuit as claimed in claim 1 wherein the burst separating circuit includes a first differential pair of transistors for generating a first control signal when the burst gate pulse is active and a second control signal when the burst gate pulse is not active.

3. The burst separator circuit as claimed in claim 2 wherein the slicer circuit includes a second differential pair of transistors for comparing the burst signal to a reference level and generating a high output signal when the burst signal is greater than the reference level and a low output signal when the burst signal is less than the reference level.

4. The burst separator circuit as claimed in claim 3 wherein the second differential pair is controlled by the first control signal.

5. The burst separator circuit as claimed in claim 4 wherein the second differential pair is active when the first control signal is active and is inactive when the first control signal is inactive.

6. The burst separator circuit as claimed in claim 5 further comprising an output circuit coupled to the slicer circuit for outputting the square waveform signal when the burst gate pulse is active and a constant DC level signal when the burst gate pulse is inactive.

7. A method of separating a burst signal from an input composite video signal comprising the steps of:
   a. receiving an input composite video signal;
   b. receiving a burst gate pulse signal representative of a time period during which the burst signal is present within the input composite video signal;

c. separating the burst signal from the input composite video signal when the burst gate pulse is active; and d. converting the burst signal to a square waveform.

8. The method as claimed in claim 7 further comprising the step of generating a first control signal when the burst gate pulse is active and a second control signal when the burst gate pulse is inactive.

9. The method as claimed in claim 8 further comprising the step of enabling a differential pair of transistors only when the first control signal is active.

10. The method as claimed in claim 9 further comprising the step of outputting the square waveform when the burst gate pulse is active.

11. The method as claimed in claim 10 further comprising the step of outputting a constant level signal when the burst gate pulse is inactive.

12. A burst separator and slicer circuit for separating a burst signal from an input composite video signal and converting it into a square waveform, comprising:

a. a receiving circuit configured for receiving a burst gate pulse signal representative of a time period during which the burst signal is present within the input composite video signal and for generating a control signal which is active when the burst gate pulse is active; and b. a burst separating and slicing circuit configured for receiving the input composite video signal and coupled to the receiving circuit for separating the burst signal from the input composite video signal when the control signal is active and for converting the burst signal to a square waveform signal.

13. The burst separator and slicer circuit as claimed in claim 12 wherein the burst separating and slicing circuit includes a comparator circuit for comparing the burst signal to a reference level signal and generating a first level signal when the burst signal is greater than the reference level signal and a second level signal when the burst signal is less than the reference level signal.

14. The burst separator and slicer circuit as claimed in claim 13 further comprising an output circuit coupled to the burst separating and slicing circuit for outputting the square waveform signal when the control signal is active and a constant level signal when the control signal is inactive.

* * * * *